G. W. KENEASTER.
WHEEL BEARING FOR VEHICLES.
APPLICATION FILED DEC. 21, 1909. RENEWED JAN. 20, 1912.
1,029,690.
Patented June 18, 1912.
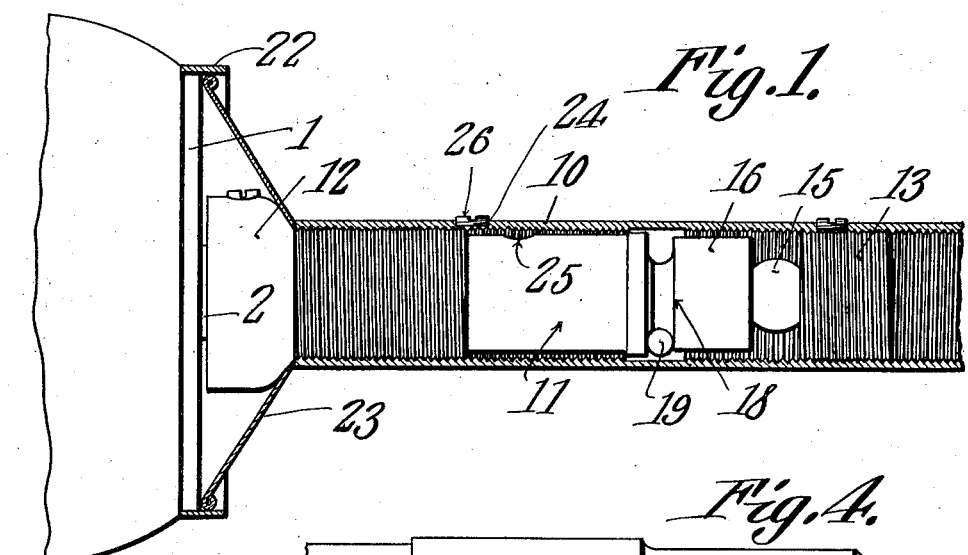
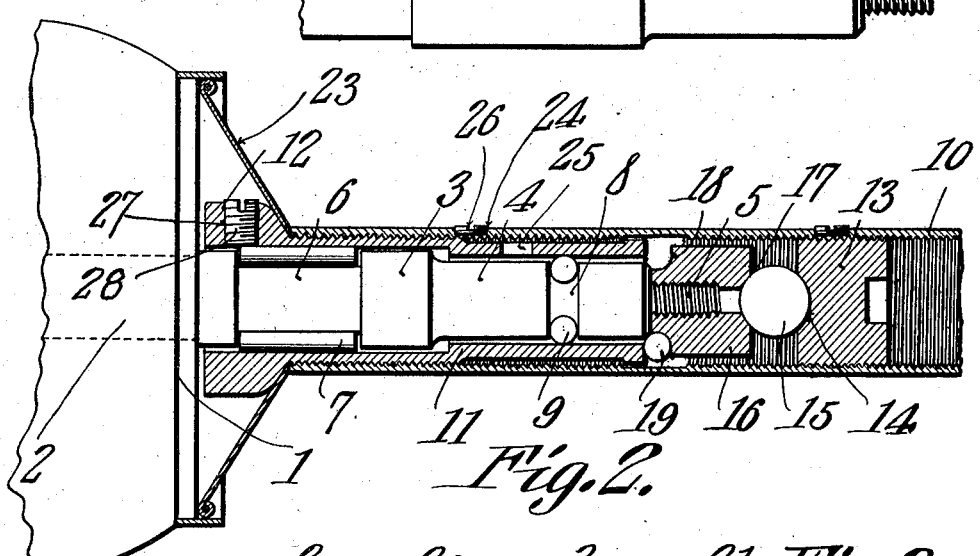
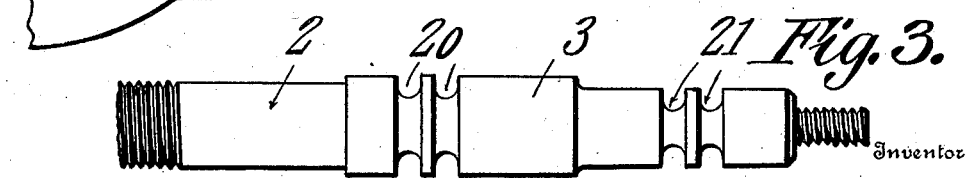
Witnesses
Inventor
George W. Keneaster.
By
Attorneys

UNITED STATES PATENT OFFICE.

GEORGE W. KENEASTER, OF GAGE, OKLAHOMA.

WHEEL-BEARING FOR VEHICLES.

1,029,690.     Specification of Letters Patent.     Patented June 18, 1912.

Application filed December 21, 1909, Serial No. 534,286. Renewed January 20, 1912. Serial No. 672,477.

*To all whom it may concern:*

Be it known that I, GEORGE W. KENEASTER, a citizen of the United States, residing at Gage, in the county of Ellis and State of Oklahoma, have invented a new and useful Wheel-Bearing for Vehicles, of which the following is a specification.

This invention relates to bearings for vehicle wheels and its principal object is to provide a bearing of this type which is located entirely within the axle of the vehicle and which includes a novel form of thrust bearing whereby lateral displacement of the wheel relative to the axle is prevented.

A still further object is to provide a combined key and anti-friction device for holding the parts of the bearings properly assembled.

A still further object is to provide a bearing which is durable and compact in construction and all parts of which are concealed within the axle.

With these and other objects in view the invention consists of certain novel details of construction and combinations of parts hereinafter more fully described and pointed out in the claims.

In the accompanying drawings the preferred forms of the invention have been shown.

In said drawings, Figure 1 is a longitudinal section through a portion of an axle and showing the bearing in elevation. Fig. 2 is a similar view showing the bearing in section. Fig. 3 is an elevation of a modified form of spindle. Fig. 4 is a similar view of another modified form of spindle.

Referring to the figures by characters of reference 1 designates the hub of a wheel, the central portion thereof being fixedly secured to the threaded end 2 of a spindle 3. The opposite end portion of the spindle is reduced in diameter as indicated at 4 and has a screw threaded stud 5 extending from the center of the end thereof. An annular groove 6 is formed within the spindle at a point between the threaded portion 2 and the reduced portion 4 and this groove constitutes the race of a series of anti-friction rollers 7. Another annular groove 8 is formed in the reduced portion 4 of the spindle and constitutes the race for a series of balls 9.

The axle 10 with which the bearing is employed is preferably tubular and has its end interiorly screw-threaded. This threaded portion of the axle surrounds and engages the exteriorly screw threaded portion of a sleeve 11 having an enlarged end 12 designed to extend beyond the end of the axle and to lie close to the wheel hub 1. A screw plug 13 is inserted into the axle 10 and is held in place by the threads in said axle, this plug being provided with a recess 14 in its outer end. A ball 15 is seated within this recess and bears against a nut 16 which is screwed onto the stud 5, said nut having a recess 17 constituting a seat for the ball. That end of the nut adjoining the end of the spindle 3 is reduced annularly as shown at 18 so as to receive a ball 19.

If preferred, and as shown in Figs. 1 and 2, the thread within the axle 10 may be cut away adjacent the reduced annular portion 18 so as to present a smooth surface to the ball 19.

In assembling the parts of the bearing herein described the plug 13 is screwed into the axle until the distance between it and the end of the axle is sufficient to receive the remaining portions of the bearing. The rollers 7 are then placed in the race 6 and the balls 9 are placed in the race 8 after which sleeve 11 is placed upon the spindle and serves to hold the anti-friction devices in the races. Nut 16 is then screwed onto the stud 5. The sleeve, spindle and nut are subsequently inserted into the axle, the ball 19 being placed in the groove 18 before said groove passes into the axle. Ball 15 is also interposed between the plug 13 and the nut 16 before said nut is inserted into the axle. After the parts have thus been assembled the sleeve 11 is screwed into the axle until the ball 15 becomes seated within both recesses 14 and 17 and thus acts as a thrust bearing. When the wheel hub rotates, the spindle turns with it and the anti-friction devices 7 and 9 obviously reduce friction to the minimum. Ball 15 takes up the thrust exerted by the spindle in the direction of the center of the axle and withdrawal of the spindle from the axle is prevented by the nut 16, which bears against the ball 19 interposed between the nut 16 and the end of sleeve 11.

In order to remove the parts it is of course necessary to first unscrew the sleeve 11. Obviously should the axle be solid except at its ends where the bearings are located, it would be unnecessary to utilize plugs 13.

If preferred, and as shown in Fig. 3, balls may be used exclusively as anti-friction devices in which event two races are preferably substituted for the race 6, as shown at 20. Also, if desired, two races 21 can be provided instead of a single race 8. Under some conditions it is desirable to dispense altogether with the anti-friction devices and in Fig. 4 a spindle has been shown which is free of races such as have been disclosed in Figs. 2 and 3. In all forms of the bearing, however, the thrust ball 15 and the combined key and thrust ball 19 are to be utilized.

It is to be understood that any preferred means may be employed for protecting the open end of the bearing from dust.

In Figs. 1 and 2 the hub has been shown provided with an annular flange or band 22 surrounding the large end of a flexible frusto-conical shield 23, the small end of which extends around the sleeve 11 and laps the enlargement or head 12.

It is to be understood of course that various means may be employed for facilitating the placing of balls within the races. For example, and as shown in the drawings, an opening 24 may be formed in the upper portion of the axle and another opening 25 may be formed within the sleeve 11, the diameters of the two openings being slightly greater than that of the anti-friction balls used in the bearing. When the parts are being assembled the race 8 in spindle 4 moves into register with the opening 25 and, while it is in this position, the balls 9 can be dropped into the race through said opening. After the spindle has been moved entirely into the sleeve the race will pass from under the opening 25 and displacement of the balls 9 will therefore be prevented. When the sleeve is subsequently inserted into the axle the ball 19 can be dropped into groove 18 through the opening 24 as soon as said groove is brought into register with the openings. This groove moves from under the opening 24 during the further inward adjustment of the sleeve and said opening 24 can then be closed by means of a screw plug 26. An opening 27 may be formed in the head of the sleeve, this opening being normally closed by means of a screw plug 28 and constituting means whereby anti-friction balls may be dropped into the races 20 when a spindle such as shown in Fig. 3 is employed.

Different changes may of course be made in the construction and arrangement of the parts without departing from the spirit or sacrificing any of the advantages of the invention as defined in the appended claims.

What is claimed is:—

1. The combination with an axle having a tubular end portion, of a sleeve removably mounted within said end portion a spindle mounted for rotation within the sleeve, an element detachably engaging the spindle and interposed between the sleeve and the inner end of said tubular portion of the axle, a thrust bearing for said element, and a combined key and thrust bearing movably mounted between the sleeve and element.

2. The combination with an axle having a tubular end portion, of a sleeve removably mounted within said end portion, a spindle mounted for rotation within the sleeve, an element removably engaging one end of the spindle and interposed between the sleeve and the inner end of the tubular portion of the axle, said element having an annularly reduced end, a thrust bearing for said element, and a ball movably mounted within the axle and between said reduced portion and the end of the sleeve, said ball constituting a combined thrust bearing and retaining key.

3. The combination with an axle having a tubular end portion, of a sleeve removably mounted within said end portion and normally fixed relative thereto, a spindle having one end portion for fixedly engaging a wheel, said spindle being mounted for rotation within the sleeve, an element detachably engaging the spindle and interposed between the sleeve and the inner end of the tubular portion of the axle, a combined thrust bearing and retaining key interposed between said sleeve and element, and a ball interposed between said inner end and said element and constituting a thrust bearing, there being seats for the ball within said end and in the element.

4. The combination with an axle having a tubular end portion and a screw plug within said end portion said plug having a recess, of a sleeve removably mounted within said end portion of the axle, a spindle having one end portion adapted to fixedly engage a wheel, said spindle being mounted for rotation within the sleeve, a threaded stud extending from the spindle, a nut detachably engaging the stud and having a recess in one end and an annular groove at its other end, a ball movably mounted within said groove and constituting a combined thrust bearing and key for the nut and spindle, and a ball seated within the recesses in the plug and nut and constituting a thrust bearing for the nut and spindle.

In testimony that I claim the foregoing as my own, I have hereto affixed my signature in the presence of two witnesses.

GEORGE W. KENEASTER.

Witnesses:
 C. E. DOYLE,
 C. E. PREINKERT.

Copies of this patent may be obtained for five cents each, by addressing the "Commissioner of Patents, Washington, D. C."